United States Patent [19]

Mori

[11] Patent Number: 4,615,521

[45] Date of Patent: Oct. 7, 1986

[54] ELEVATOR BETWEEN TRANSFER PASSAGES

[75] Inventor: Noriaki Mori, Hikone, Japan

[73] Assignee: Dainippon Screen Manufacturing Co., Ltd., Kyoto, Japan

[21] Appl. No.: 585,470

[22] Filed: Mar. 2, 1984

[30] Foreign Application Priority Data

Apr. 30, 1983 [JP] Japan ............................ 58-65891[U]

[51] Int. Cl.⁴ .............................................. B65H 5/00
[52] U.S. Cl. ...................... 271/264; 271/84; 271/128; 271/199; 271/275; 414/45
[58] Field of Search ............... 271/264, 225, 184, 185, 271/275, 198, 199, 269, 84, 128, 157, 3.1; 414/45

[56] References Cited

U.S. PATENT DOCUMENTS

| | | | |
|---|---|---|---|
| 3,403,799 | 10/1968 | Sindzinski et al. | 198/435 |
| 3,841,500 | 10/1974 | Helminen | 414/45 |
| 4,099,712 | 7/1978 | Martin | 271/184 |
| 4,148,473 | 4/1979 | Johnson | 271/157 |

Primary Examiner—Bruce H. Stoner, Jr.
Assistant Examiner—John A. Carroll
Attorney, Agent, or Firm—Millen & White

[57] ABSTRACT

An apparatus for transferring a sheet-like article such as a wafer between a first horizontal passage defining a first plane and a second horizontal passage defining a second plane at a different level from said first plane comprising a carriage vertically movable between said first and second planes for transferring said sheet-like article between said first and second horizontal passages.

3 Claims, 2 Drawing Figures

ELEVATOR BETWEEN TRANSFER PASSAGES

BACKGROUND OF THE INVENTION

The present invention relates to an elevator for lifting and lowering thin sheet-like articles, such as glass substrates and semiconductor substrates (hereinafter referred to as wafers), one by one.

When various wafers are surface-treated, for example, when a resist is to be applied to the surface, there are cases where wafer transfer level differs from place to place such that between the coater and a device for printing a predetermined pattern on the resist-coated wafer, the transfer passage for the treating process using a chemical liquid is at a high position, while that for the exposure process not using any chemical liquid is a low position. Further, the transfer level sometimes also differs between the exposure device and the developing device subsequent thereto.

Conventionally, in the resist applying process, from a cassette containing a predetermined number of wafers, the wafers are delivered one by one, coated with a resist by a rotary coater, and dried in an oven, whereupon they are stored one by one in another cassette. The cassette thus storing a predetermined number of wafers is then transferred to the loader of the exposure device in the subsequent process by hand or by a transfer robot.

Thus, according to the conventional method of transferring wafers, cassettes each containing a predetermined number of wafers are transferred through various processes different in level. This method, however, has disadvantages that the long waiting period required results in impurites adhering to wafers and that there is danger of damaging wafers during transfer.

It is an object of the present invention to provide an appratus for automatically transferring wafer one by one by an elevator between transfer passages locating at different levels, for example, between a coater and an exposure device.

BRIEF SUMMARY OF THE INVENTION

According to the present invention, there is provided an apparatus for transferring a sheet-like article between a first horizontal passage and a second horizontal passage locating at a different level from the first passage. A carriage for supporting the sheet-like article is vertically movable between the first and second horizontal passages.

In the illustrated embodiment, said first and second horizontal passages comprise a pair of transfer or conveyor belts all intermittently and sychronously moving in a selected direction, and the carriage is movable between a first plane which is generally coplanar with the first horizontal passage and a second plane which is generally coplanar with and adjacent to the second horizontal passage. Thus the carriage lifts a wafer resting on the first passage in the first plane to said second plane adjacent to said second horizontal passage and vice versa. Means are provided for pushing wafer from the carriage to the second passage when the wafer has been lifted to said second plane. Said means also serve as a stopper for placing the wafer in position on the carriage when the wafer is delivered from the second passage to the carriage before the wafer is lowered to the first passage by the carriage.

Preferably at least one of said first and second horizontal passages is adjustable in its vertical position relative to the other.

DESCRIPTION OF THE PREFERRED EMBODIMENTS

Figure 1:
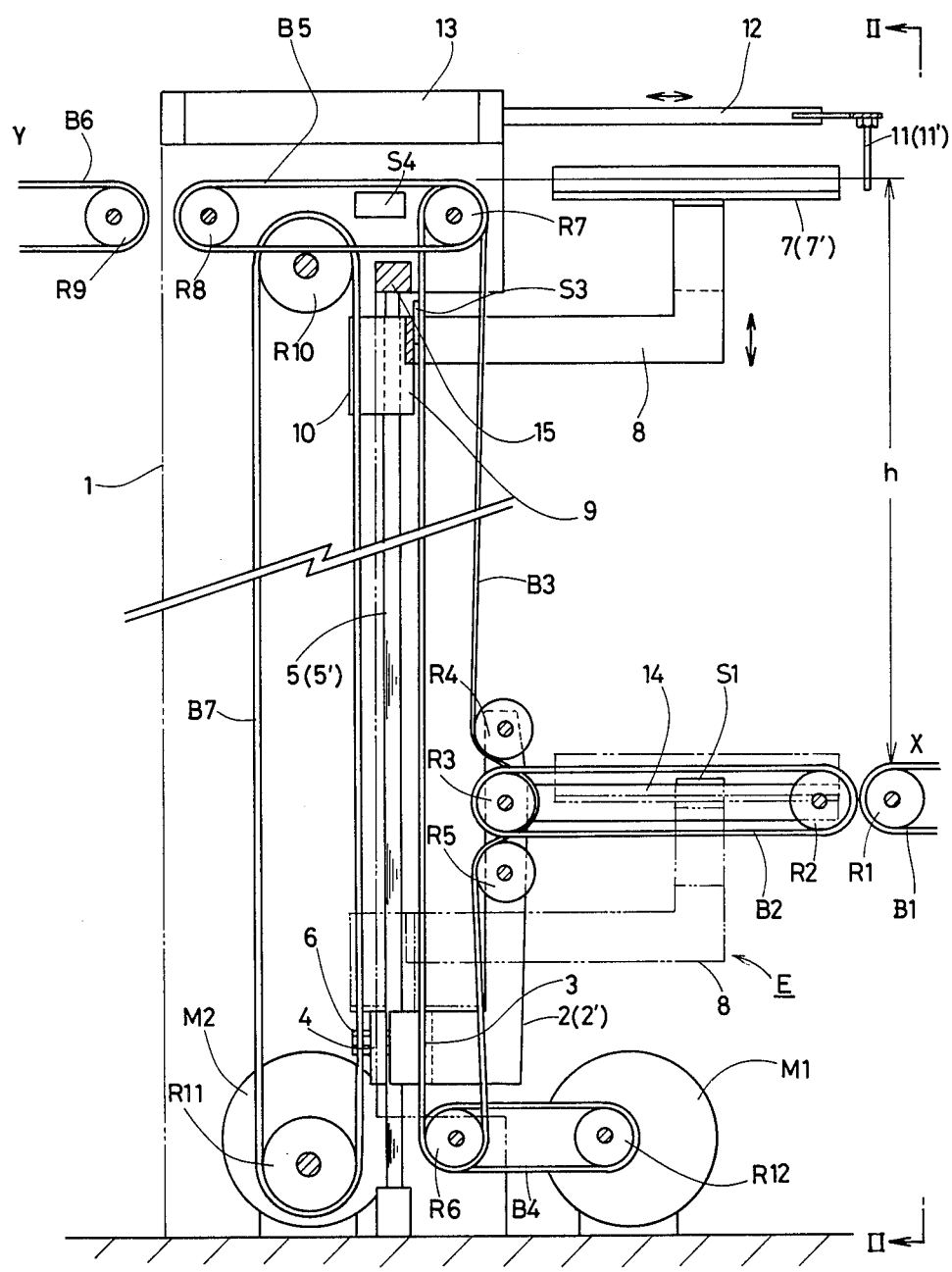
FIG. 1 is a front elevational view of an embodiment of the apparatus of the present invention.
Figure 2:
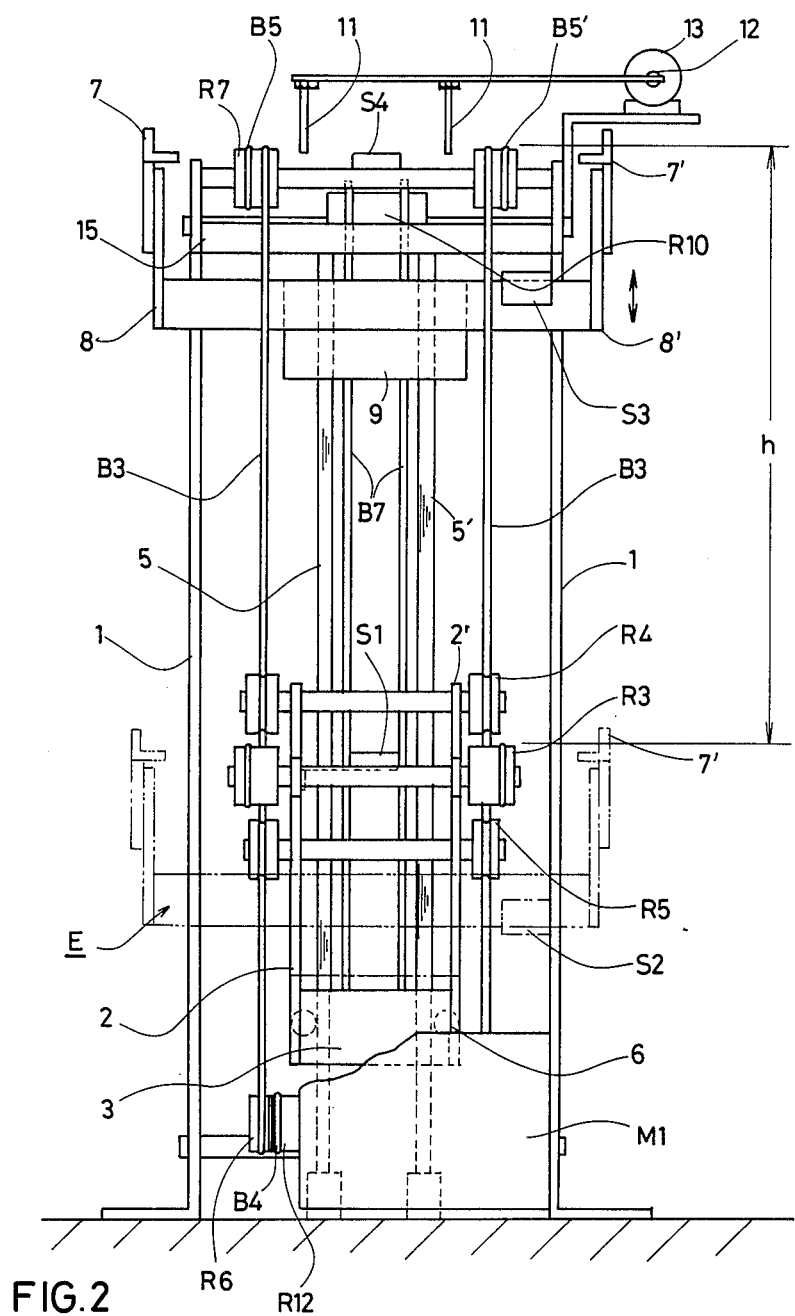
FIG. 2 is side elevational view taken along the line II—II in FIG. 1.

In the embodiment shown in FIG. 1, where there is a level difference h between wafer treating devices X and Y, an elevator E is interposed between the two treating devices. A transfer belt B1 is installed at the inlet or outlet of the treating device X, while a transfer belt B6 is installed at the inlet or outlet of the treating device Y. Thus, the difference in level between the upper surfaces of the transfer belts B1 and B6 is equal to the level difference h.

A pair of endless belts B5 and B5' forming a second horizontally disposed conveyor belt means extend to the level of the transfer belt B6 adjacent thereto and are entrained between and around rolls R7 and R8. These rolls R7 and R8 are fitted on shafts journaled in a frame 1 and are rotatable. The roll R7 has a drive belt B3, to be later described, entrained therearound, the roll R7 being driven.

At the same level as that of said transfer belt B1, an endless belt B2 which is a first horizontally disposed conveyor belt is entrained between and around rolls R2 and R3 adjacent to the transfer belt B1. These rolls R2 and R3 are fitted on shafts journaled in arms 2 and 2' and are rotatable. The roll R3 has said drive belt B3 entrained therearound, whereby the roll R3 is driven. The drive belt B3 is driven by a motor M1 and for this purpose a drive belt B4 is entrained around and between a roll R12 directly connected to the motor M1 and a roll R6 disposed at the lower end of the frame 1. The drive belt B3 is entrained around said rolls R6 and R7 and engaged with the rolls R3, R4 and R5. Therefore, the endless belts B5 and B2 are driven at the same time in the same direction at the same speed by the motor M1 through the drive belts B4 and B3.

The arms 2 and 2' in which said rolls R2, R3, R4 and R5 are journaled integrally extend from a block 3. The block 3 is locked to guide shafts 5 and 5' by a holder 4 and bolts 6. The level of the endless belt B2 can be changed by changing the position at which the block 3 is locked to the guide shafts 5 and 5' by the holder 4 and bolts 6.

Disposed adjacent the middle upper end region of the pair of endless belts B2 is a photosensor S1 attached to a bracket 14 fixed to the arm 2. The photosensor S1 senses the presence or absence of a wafer placed on and transferred by the endless belts B2. Of course, the photosensor S1 can be vertically moved together with the arm 2 to change its vertical position.

Lifters 7 and 7' or carriage which form an elevator platform for supporting the opposite ends of a wafer are fixed to an arm 8, which integrally extends from a block 9. The block 9 is fitted on said guide shafts 5 and 5' so that it is slidable up and down along the guide shaft 5 and 5' above said block 3. That is, the drive belts B7 entrained around the rolls R10 and R11 are held between the block 9 and a holder 10 so that the block 9 is lifted and lowered by the motor M2. As a result, the lifters 7 and 7' are lifted and lowered together as a pair of spaced platform portions.

Photosensors S3 and S2 for sensing the upper and lower limit positions of the block 9 ensure that the lifter 7 stops when the level of the wafer carried on the lifter 7 is somewhat below the upper ends of the endless belts B5 and B2. When the lifters 7 and 7' are at the upper limit position, the wafer on the lifters 7 and 7' is horizontally transferred to the endless belt B5 by two pins 11. The pins 11 and 11' are attached to the front end of the rod 12 of an air cylinder 13 and the piston movement of said air cylinder 13 moves the pins 11 and 11' parallelly in the direction in which the endless belt 5 is entrained, causing the wafer to move from the lifters 7 and 7' onto the endless belt B5. In addition, the numeral 15 denotes a transverse frame transversely mounted on the frames 1 to fix the guide shafts 5 and 5'.

The apparatus according to this embodiment operates in the following manner.

(Transfer of wafers from the treating device X to the treating device Y)

After the photosensor S1 has sensed that there is no wafer on the endless belt B2, a wafer carried on the transfer belt B1 at the outlet of the wafer treating device X is transferred from the transfer belt B1 to the endless belt B2. With the photosensor S1 sensing that the wafer has been moved to the middle of the endless belt B2, the motor M1 is stopped. Concurrently, the motor M2 is operated to lift the arm 8 from its lower limit to upper limit position. The wafer on the endless belt B2 is raised by the lifters 7 and 7' until it reaches its upper limit position, i.e., substantially the same level as the upper level of the endless belt B5. The photosensor S3 senses the arm 8, whereupon the motor M2 is stopped. Concurrently, the air cylinder 13 is actuated to cause the pins 11 and 11' to transfer the wafer from the lifters 7 and 7' to the endless belt B5. At the same time as the motor M2 is stopped, the motor M1 is operated again so that the wafer carried on the belt B5 is transferred to the transfer belt B6 for the inlet of the treating device Y. After the photosensor S4 disposed at the middle of the endless belt B5 has sensed the wafer, the air cylinder 13 is operated to return the pins 11 and 11' to their original position, whereupon the motor M2 is operated to lower the lifters 7 and 7' to their lower limit position. The photosensor S2 senses the lower limit position and stops the motor M2. The next wafer is transferred from the transfer belt B1 to the endless belt B2 and the same operation as described above is repeated; in this manner, wafers can be transferred one by one from the treating device X to the treating device Y.

(Transfer of wafers from the treating device Y to the treating device X)

As shown in FIG. 1, when the lifters 7 and 7' are at their upper limit position with the rod 12 of the air cylinder 13 extending, a wafer is transferred from the transfer belt B6 for the outlet of the treating device Y to the endless belt B5 and then to the lifters 7 and 7' by the inertia of the wafer and a small difference in level between the endless belt B5 and the lifters 7 and 7'. In this case, the pins 11 and 11' serve as stoppers to prevent the wafer from running out of the lifters 7 and 7'.

Then the photosensor S4 installed at the middle lower region of the endless belt B5 senses that a wafer has been transferred from the endless belt B5 and, a moment later, the motor M2 is operated to lower the block 9. The wafer carried on the lifters 7 and 7' is brought to the lower limit position and then transferred from the lifters 7 and 7' to the endless belt B2, by which it is transferred to the transfer belt B1 of the treating device X.

In addition, the photosensor S2 which senses the lower limit position of the block 9 stops the motor M2 and after the photosensor S1 has sensed that the wafer on the endless belt B2 has been transferred to the transfer belt B1, the motor M2 is operated to lift the lifters 7 and 7', thus moving them to their original position shown in FIG. 1. The next wafer is transferred from the transfer belt B6 via the endless belt B5 to the lifters 7 and 7', and the same operation as described above is repeated.

The present invention has the following advantages.

(1) Since both the transfer passages and the lifters carry thin sheet-like articles on them and lift and lower the articles, there is no possibility of the upper surfaces of the thin sheet-like articles being contacted by an object, so that they can be moved up and down for transfer without being damaged or contaminated.

(2) Since the elevator is designed to simply lift and lower the lifters on which the outer edges of thin sheet-like articles are placed, the mechanism is simplified and inexpensive, and causes less trouble.

(3) If the lifters are adapted to carry a single thin sheet-like article, such articles can be reliably lifted and lowered for transfer one by one and the transfer condition can be controlled by the lifters, so that the transfer passages can be kept in order.

(4) Even if there are various vertical positions of the lower level transfer passage, the present invention can adapt to this situation by simple adjustment.

What is claimed is:

1. An apparatus for transferring one at a time sheet-like articles, such as wafers for electronics circuits, from a first processing station at first vertical level to a second processing station at a second vertical level, the apparatus comprising:

first horizontally disposed conveyor belt means at the first vertical level;

second horizontally disposed conveyor belt means at the second vertical level;

means for driving the first and second horizontally disposed conveyor belt means in synchronism with one another;

an elevator platform disposed in alignment with the first horizontally disposed conveyor belt means, the elevator platform having a pair of spaced portions disposed on opposite sides of the first horizontally disposed conveyor belt means and being coextensive with the first conveyor belt means, wherein the spaced portions support the sheet-like articles only adjacent the edges thereof;

means for moving the elevator platform from the first vertical level to the second vertical level to carry sheet-like articles from the first vertical level to the second vertical level;

pusher means for pushing the sheet-like articles from the elevator platform onto the second horizontally disposed conveyor belt, the pusher means being aligned between the spaced platform portions of the elevator platform and having a width less than the space between the platform portions;

an additional second level, horizontally disposed conveyor belt aligned with the second horizontally disposed conveyor belt means at the second vertical cal level for receiving the sheet-like articles from the second horizontally disposed conveyor belt means for processing at the second processing station for treating the sheet-like article;

an additional first-level horizontally disposed conveyor belt aligned with the first horizontally disposed conveyor belt means for moving the sheet-like articles from processing at the first processing station for treating the sheet-like article onto the first horizontally disposed conveyor belt, and sensor means for detecting the presence of a sheet-like article at the first and second levels, and for detecting the position of the platform relative to the levels whereby signals are provided for operating the drive means for the first and second horizontally disposed conveyor belt means and for operating the drive means for the elevator platform.

2. The apparatus of claim 1 wherein the means for driving the first and second horizontally disposed conveyor belt means includes a first endless belt which is trained around rollers driving the conveyor belt means and an electric motor for driving the first endless belt.

3. The apparatus of claim 2 wherein the means for moving the elevator platform includes a second endless belt and an electric motor for driving the second endless belt, wherein the platform is moved up and down depending on the direction in which the second endless belt is driven.

* * * * *